(12) United States Patent
Marchand et al.

(10) Patent No.: US 6,914,613 B2
(45) Date of Patent: Jul. 5, 2005

(54) COLOR SELECTION METHOD

(75) Inventors: Catherine Anne Marchand, Wilmington, DE (US); Guy N. Rydberg, North Oaks, MN (US)

(73) Assignees: E. I. du Pont de Nemours and Company, Wilmington, DE (US); Yada Systems Inc., Roseville, MN (US)

( * ) Notice: Subject to any disclaimer, the term of this patent is extended or adjusted under 35 U.S.C. 154(b) by 61 days.

(21) Appl. No.: 10/699,049

(22) Filed: Oct. 30, 2003

(65) Prior Publication Data

US 2004/0093112 A1 May 13, 2004

Related U.S. Application Data

(60) Provisional application No. 60/422,705, filed on Oct. 31, 2002.

(51) Int. Cl.[7] ............................. G09G 5/02; G06F 17/30
(52) U.S. Cl. ..................... 345/593; 345/597; 345/549; 382/162; 707/3; 707/6; 427/514
(58) Field of Search ....................... 345/581, 589–593, 345/597, 600–602, 549; 382/162–167; 358/518, 517; 707/1, 3–6, 102–104, 10; 427/218, 514

(56) References Cited

U.S. PATENT DOCUMENTS

| | | | |
|---|---|---|---|
| 4,403,866 A | | 9/1983 | Falcoff et al. |
| 6,122,391 A | * | 9/2000 | Ringland et al. ............ 382/100 |
| 6,343,264 B1 | | 1/2002 | Fenton et al. |
| 6,539,325 B1 | * | 3/2003 | Numata et al. ............. 702/127 |
| 2001/0034668 A1 | | 10/2001 | Whitworth |
| 2001/0047309 A1 | | 11/2001 | Bartholomew et al. |
| 2001/0049592 A1 | | 12/2001 | Brunt et al. |
| 2002/0036778 A1 | | 3/2002 | Wagner et al. |
| 2002/0041288 A1 | | 4/2002 | Myers |
| 2003/0067475 A1 | * | 4/2003 | Hirayama et al. .......... 345/589 |
| 2003/0174143 A1 | * | 9/2003 | Rice et al. ................. 345/589 |
| 2005/0038557 A1 | * | 2/2005 | Friel et al. ................. 700/233 |

FOREIGN PATENT DOCUMENTS

| | | |
|---|---|---|
| WO | WO01/86521 A2 | 8/2000 |
| WO | WO01/25737 A1 | 10/2000 |
| WO | WO01/41012 A2 | 11/2000 |
| WO | WO01/44767 A1 | 12/2000 |
| WO | WO01/40970 | 6/2001 |
| WO | WO01/07090 | 12/2001 |

OTHER PUBLICATIONS

Color Vision in Instrumental Color Matching of Solid and Metallic Colors. A. J. Rodrigues. (Proceedings of the Sixteenth International Conference in Organic Coatings Science and Technology, Athens, Greece 1990).

Theory and Implementation of Modern Techniques of Color Conception, Matching and Control. A. J. Rodrigues. (Proceedings of the Fifth International Conference in Organic Coatings) Science and Technology, vol. 3, Advances in Organic Coatings Science and Technology Series, pp. 272–282 (1979).

* cited by examiner

*Primary Examiner*—Kee M. Tung
*Assistant Examiner*—Wesner Sajous
(74) *Attorney, Agent, or Firm*—Sudhir G. Deshmukh

(57) ABSTRACT

The present invention is directed to a color selection method, which includes the steps of selecting colors in accordance with identification criteria supplied, for example, by a vehicle manufacturer; displaying the colors in the form of color reference chips on the screen of a display unit attached to a computer; selecting a desired color chip from the color reference chips on the screen; accessing and displaying color formulas; and then finally selecting a desired color formula that lists all the ingredients needed to prepare a coating composition, such as automotive refinish paint or architectural paint, from the color formulas displayed on the screen. The technician can then mix the ingredients, such as tints, in the proportions provided in the desired color formula to make the coating composition. If desired, the method further includes sending the desired color formula to a weighing scale or a tint dispenser attached to the computer so that the ingredients listed in the desired formula can be weighed or dispensed automatically.

21 Claims, 10 Drawing Sheets

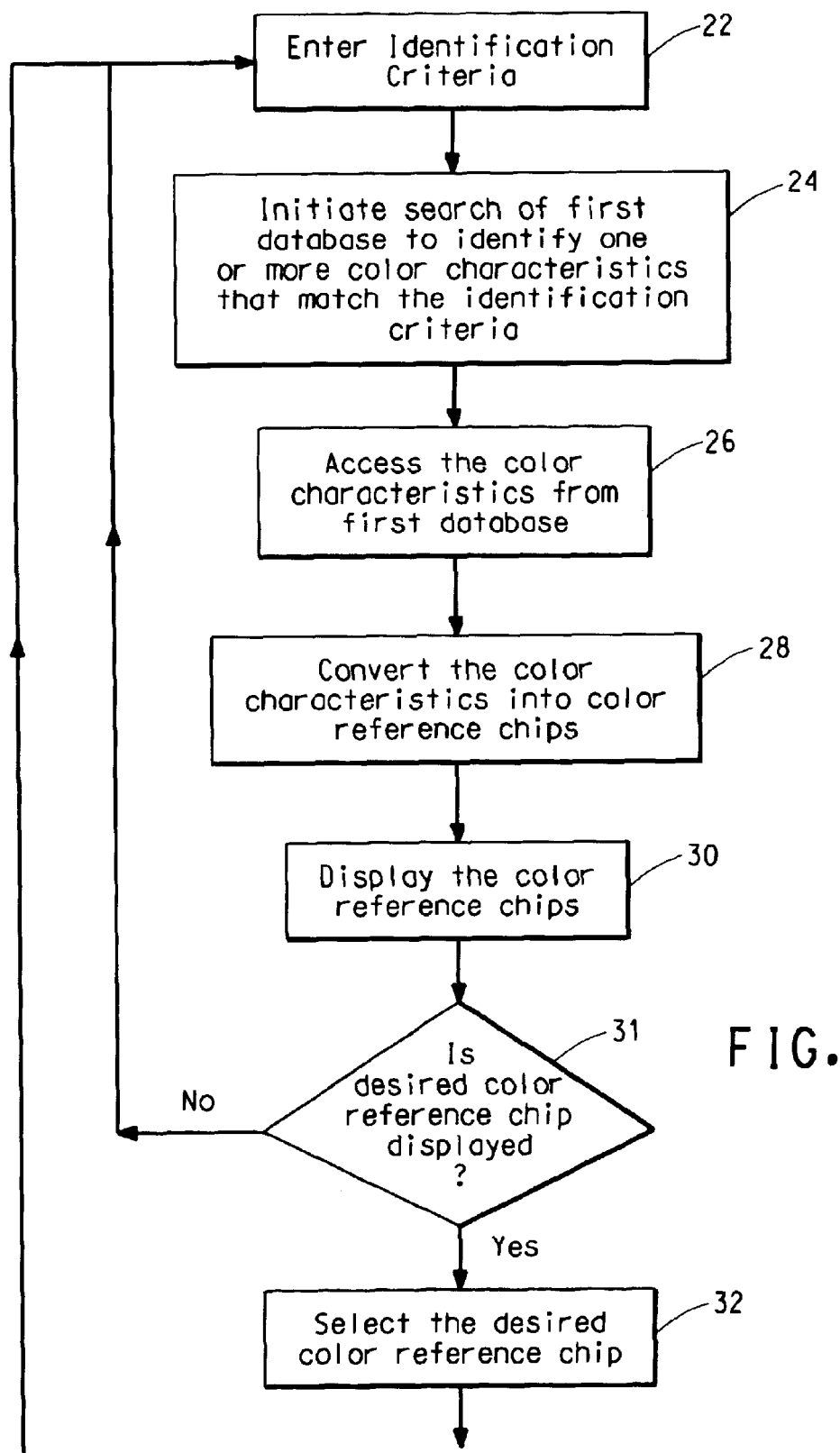

FIG. 5

Select one of the search options below...
Stock Code | Car Code/Year

Current Filter Settings

| | | |
|---|---|---|
| Manufacturer | Starts With | FORD |
| Mfr Code | Starts With | |
| Color | Starts With | |
| Year | Equals | 2000 |

Appl Type:

Scan | Get Next 100 | Color Patches

| Stock Code | Mfr Name | Mfr Code | Color | Year |
|---|---|---|---|---|
| C9055 | FORD MOTOR COMPANY | 6516 | JEWEL GREEN | 2000 |
| C9237 | FORD MOTOR COMPANY | 6517 | VERMILLION | 2000 |
| C9238 | FORD MOTOR COMPANY | 6519 | TAUPE | 2000 |
| C9209 | FORD MOTOR COMPANY | 6519 | BLACK | 2000 |
| C9248 | FORD MOTOR COMPANY | 6522G | MED TITANIUM MET | 2000 |
| C9436 | FORD MOTOR COMPANY | 6529 | LT GRAY | 2000 |
| C9848 | FORD MOTOR COMPANY | 6530 | DARK GRAY | 2000 |
| C9437 | FORD MOTOR COMPANY | 6534 | TITANIUM FROST | 2000 |
| C9239 | FORD MOTOR COMPANY | 6535 | REGATTA BLUE | 2000 |
| C9210 | FORD MOTOR COMPANY | 6536 | RED | 2000 |

Retrieved: 100 | Displayed: 37.4 | Matches: | Select

DUPONT - LIONVILLE TECHNICAL CENTER (#1007/3)

COLOR SELECTION METHOD

CROSS-REFERENCE TO RELATED APPLICATION

This application claims priority under 35 U.S.C. §119 from U.S. Provisional Application Ser. No. 60/422,705 (filed Oct. 31, 2002), which is incorporated by reference herein as if fully set forth.

FIELD OF THE INVENTION

The present invention is generally directed to a color selection method used for selecting colors for coating compositions and preparing pigmented coating compositions used for coating substrates. The invention more particularly relates to the selection method of displaying on computer screens color reference chips of paints and color formulas used for producing the coating compositions, such as automotive refinish paints, architectural paints, and industrial coating compositions.

BACKGROUND OF THE INVENTION

In order to select an appropriate paint formula, the collision repair process used for restoring damaged areas of vehicles requires the technician or distributor to correctly identify the vehicle being repainted. In order to enable that identification, automotive paint manufacturers typically produce reference materials for the end users, such as collision repair shops. The primary reference materials generally known as 'color reference chips' are typically provided in the format of a printed book or manual. Along with actual reproductions of the reference colors (made from paint or inks), additional information, such as the vehicle manufacturer, make, model and year of production, paint code, and frequently a stock code or other identifying code specific to the paint manufacturer, is also included. These color reference chip manuals are produced by paint manufacturers and mailed periodically to the distributors and collision repair shops or other customers. Obviously, as the vehicle manufacturers change or add new colors to their lines of vehicles, these color reference chip manuals, which are quite expensive to produce, have to be also produced frequently, typically at least once or twice a year. Once a user identifies the correct paint code by using the standard color reference chip manual, she then must refer to yet another reference material, typically a microfiche or PC-based or web-based computer database, that provides the list of various components, such as tints, required to be mixed in certain proportions according to a formula or recipe to produce the paint that had been previously identified in the color reference chip manual. Thus, the current process used in identifying and then preparing the specific paints is not only cumbersome and time consuming but it is also quite expensive since costly color reference chip manuals have to be frequently printed, typically twice a year and then supplied to the collision shops and distributors. Thus, a continuing need exists for simplifying the aforedescribed complex and expensive multi-step process.

Some approaches have been tried to address some of the issues listed above. For example, BASF has recently released a new tool, called the BASF Antique Color Chip CD-ROM for restorers and collectors of older cars, that takes the guesswork out of choosing the color they need. The Antique Color Chip CD, contains digital images of more than 5,700 original color chip pages, covering models from 1936 to 1972. However, none of the prior art addresses the aforementioned issues addressed by the present invention.

SUMMARY OF THE INVENTION

The present invention is directed to a color selection method comprising:

(a) entering identification criteria of a color of a coating composition into a computer (10);

(b) initiating a search of a first database to identify one or more color characteristics that match the identification criteria;

(c) accessing said color characteristics from said first database;

(d) converting said color characteristics into color reference chips;

(e) displaying said color reference chips on screen of said computer (10);

(f) selecting a desired color reference chip from said color reference chips;

(g) accessing one or more color formulas from a second database that match said desired color reference chip;

(h) displaying said color formulas on said screen; and (i) selecting a desired color formula from said color formulas.

The present invention is further directed to a color selection method comprising:

(a) entering identification criteria of a color of a coating composition into a client computer (10A);

(b) initiating a search of first database stored on said client computer (10A) to identify one or more color characteristics that match the identification criteria;

(c) accessing said color characteristics from said first database;

(d) converting said color characteristics into color reference chips;

(e) displaying said color reference chips on screen of said client computer (10A);

(f) selecting a desired color reference chip from said color reference chips displayed on said screen;

(g) sending chip identification data on said desired color reference chip to said host computer (16);

(h) receiving from said host computer one or more color formulas that match said desired color reference chip, wherein said color formulas are stored in a second database on said host computer (16);

(i) displaying said color formulas on screen of said client computer (10A); and (j) selecting a desired color formula from said color formulas.

The present invention is further directed to a color selection method comprising:

(a) receiving from a client computer (10A) an identification criteria of a color of a coating composition, said client computer being in communication with a host computer (16);

(b) sending to said client computer (10A) one or more color reference chips converted by said host computer (16) from color characteristics that match the identification criteria of said color;

(c) receiving from said client computer (10A) chip identification data on said desired color reference chip selected by said client computer (10A) from said color reference chips; and (d) sending to said client computer (10A) one or more color formulas that match said desired color reference chip to allow selection of a desired color formula from said color formulas.

The present invention is also directed to a computer program product comprising:

(a) a computer usable storage medium (11) having computer readable program code means embodied therein for causing selection of a desired color formula by a computer (10), said computer readable program code comprising:

(b) computer readable program code devices configured to cause said computer (10) to enter identification criteria of a color of a coating composition into said computer (10);

(c) computer readable program code devices configured to cause said computer (10) to initiate search of a first database for identifying one or more color characteristics that match the identification criteria, wherein said first database is stored on said computer (10);

(d) computer readable program code devices configured to cause said computer (10) to access said color characteristics from said first database;

(e) computer readable program code devices configured to cause said computer (10) to convert said color characteristics into color reference chips;

(f) computer readable program code devices configured to cause said computer (10) to display said color reference chips on screen of said computer (10);

(g) computer readable program code devices configured to cause said computer (10) to select a desired color reference chip from said color reference chips;

(h) computer readable program code devices configured to cause said computer (10) to access one or more color formulas that match said desired color reference chip wherein said color formulas stored in a second database on said computer (10); and (i) computer readable program code devices configured to cause said computer (10) to display said color formulas on said screen.

The present invention is further directed to a computer program product comprising:

(a) a client computer usable storage medium (11A) having computer readable program code means embodied therein for causing selection of a desired color formula by a client computer (10A) in communication with a host computer (16), said client computer readable program code comprising:

(b) computer readable program code devices configured to cause said client computer (10A) to enter identification criteria of a color of a coating composition into said client computer (10A);

(c) computer readable program code devices configured to cause said client computer (10A) to initiate search of a first database for identifying one or more color characteristics that match the identification criteria, said first database being stored on said client computer (10A);

(d) computer readable program code devices configured to cause said client computer (10A) to access said color, characteristics from said first database;

(e) computer readable program code devices configured to cause said client computer (10A) to convert said color characteristics into color reference chips;

(f) computer readable program code devices configured to cause said client computer (10A) to display said color reference chips on screen of said client computer (10A);

(g) computer readable program code devices configured to cause said client computer (10A) to send from said client computer (10A) to said host computer (16) identification data on a desired color reference chip selected from said color reference chips displayed on said screen;

(h) computer readable program code devices configured to cause said client computer (10A) to receive from said host computer (16) one or more color formulas that match said desired color reference chip, said color formulas being stored in a second database on said host computer (16); and (i) computer readable program code devices configured to cause said client computer (10A) to display said color formulas on screen of said client computer (10A) to allow selection of said desired color formula from said color formulas.

The present invention is also directed to a host computer program product comprising:

(a) a host computer usable storage medium (16A) having computer readable program code means embodied therein for causing selection of a desired color formula by a client computer (10A) in communication with said host computer (16), said host computer readable program code comprising:

(b) computer readable program code devices configured to cause said host computer (16) to receive from said client computer (10A) an identification criteria of a color of a coating composition;

(c) computer readable program code devices configured to cause said host computer (16) to send said client computer (10A) one or more color reference chips converted by said host computer (16) from color characteristics that match the identification criteria of said color;

(d) computer readable program code devices configured to cause said host computer (16) to receive from said client computer (10A) chip identification data on said desired color reference chip selected by said client computer (10A) from said color reference chips; and (e) computer readable program code devices configured to cause said host computer (16) to send to said client computer (10A) one or more color formulas that match said desired color reference chip to allow selection of a desired color formula from said color formulas.

The present invention is further directed to a process for making coating composition comprising:

(a) entering identification criteria of a color of a coating composition into a computer (10A);

(b) initiating a search of a first database to identify one or more color characteristics that match the identification criteria, said first database being stored on said computer (10A);

(c) accessing said color characteristics from said first database;

(d) converting said color characteristics into color reference chips;

(e) displaying said color reference chips on screen of said computer (10A);

(f) selecting a desired color reference chip from said color reference chips;

(g) accessing one or more color formulas from a second database that match said desired color reference chip, said second database being stored on said computer (10A);

(h) displaying said color formulas on said screen;

(i) selecting a desired color formula from said color formulas; and (j) mixing components listed in said desired color formula to form said coating composition.

BRIEF DESCRIPTION OF THE DRAWINGS

FIGS. 3A and 3B represent a flowchart that broadly illustrates the steps taking place in the embodiment of the process of the present invention illustrated in FIG. 1.

FIGS. 4 and 5 illustrate screen shots of one or more identification criteria entered in step 22 shown in FIG. 3A.

FIG. 6 is a screen shot of one or more color reference chips that match the identification criteria entered in the step 22 in FIG. 3A.

FIG. 7 is a screen shot of color formulas that match the desired color reference chip selected in step 32 in FIG. 3A.

DETAILED DESCRIPTION OF THE PREFERRED EMBODIMENT

Figure 1:
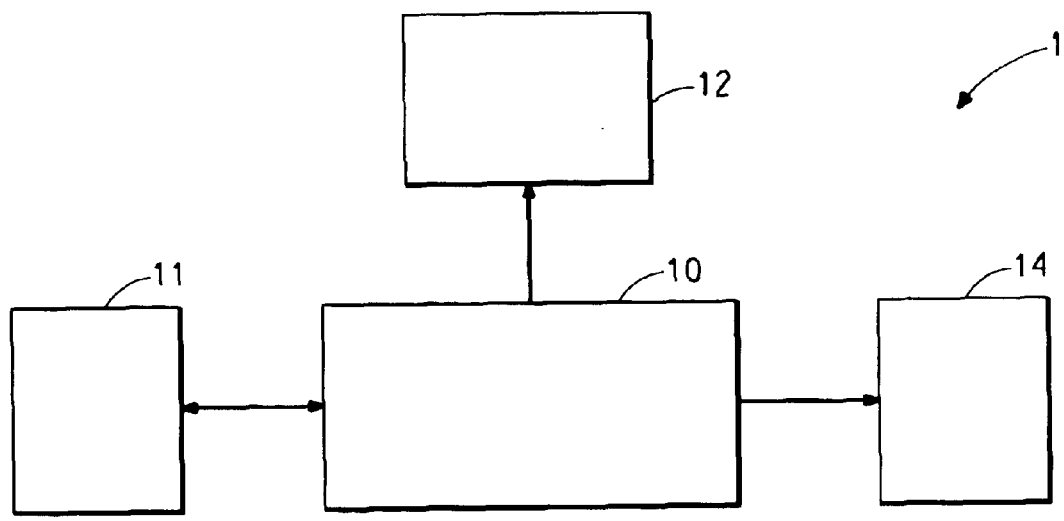
FIG. 1 broadly illustrates the hardware involved in one embodiment of the process of the present invention.

As defined herein:

"Vehicle" includes an automobile; truck; semi-truck; tractor; motorcycle; trailer; ATV (all terrain vehicle); pick-up truck or a heavy mover, such as a bulldozer, mobile crane and earth mover; airplanes; boats; ships and other modes of transport that get coated with coating compositions.

The traditional approach to displaying color reference chips has been to periodically obtain Original Equipment Manufacturer (OEM) color chip standards from OEM corporations (Ford, Daimler Chrysler, General Motors, etc.) for each vehicle model [Jeep® (Trademark of Daimler Chrysler Corporation), Chevrolet® (Trademark of General Motors Corporation), Mercury® (Trademark of Ford Motor Corporation), etc.], produce one or more paint formulas that match the OEM color chip standard, prepare the paint based on the paint formula, mass produce color reference chips on high gloss paper by applying the paint on the high gloss paper and then trimming the high gloss paper to the color reference chip size, mount the color reference chips on book size papers or other backings pre-printed with relevant information about the color reference chip, and finally collate in a color reference chip manual all these papers directed to various OEMs and their vehicle models. Production of physical color chips is an extremely costly and time-consuming process, requiring multiple labor-intensive and therefore costly steps, such as developing standards for the manual, prototyping, visual inspection and approval, printing, and inventorying of the manuals. In view of the magnitude of the effort needed to produce the manual, they are produced not more than twice annually. As a result, they are not available to the users in a timely fashion. Since the OEMs often change their vehicle line-ups after the standards have been distributed, the manuals often tend to be not up-to-date, and thus tend to illustrate colors not actually produced or not actually applied on vehicles.

Moreover, these color reference chip manuals then have to be shipped or distributed to body shops, painters, and paint distributors. The end-user also has to laboriously maintain these frequently updated multiple color reference chip manuals in the shop, leaf through these multiple color reference chip manuals depending upon the year of manufacture and model of the vehicle to find the specific color needed, confirm the information, and then access the color formula that matches the selected color reference chip via a conventional computer software or microfiche. Thus, it can be seen that the traditional approach is quite cumbersome, time consuming and costly.

The present invention is directed to a method of providing the same visual and informational capability of physical color reference chips, such as those currently available in the color reference chip manuals supplied by the paint manufacturers, via an electronic delivery medium, such as a PC-based or website-based software. The on-screen display of 'color reference chips' allows the end-user to visually confirm the color of the desired color chip to the same degree of details currently available in the color reference chip manuals and then move directly to a database containing color formula required to produce the formula look-up. The format of the present process is purposely kept similar to that of the conventional color chip reference manuals. As a result, the users of the conventional color chip reference manual can easily transition from the printed version of the color ship manual to the PC-based or website-based process of the present invention. However, unlike the conventional process, the user can then readily access the details of the desired color formula. The new process also offers a more timely and accurate information and formulas due to its ability to update the color reference chips and associated information much more frequently than once or twice annually as done currently, possibly even on a daily basis.

FIG. 1 shows the preferred embodiment 1 of the present invention wherein a conventional stand-alone computer 10 is connected to a conventional display unit 12, such as a conventional cathode ray tube or an active matrix display and is optionally connected to a conventional printer 14. As is well known, display unit 12 can be an integral part of computer 10, such as a display screen of a lap top computer. Computer 10 is provided with a conventional computer usable storage medium 11, such as, a floppy disc or CD-ROM. A user typically uploads the contents of computer usable storage medium 11 into computer 10 during use by inserting computer usable storage medium 11 into computer 10. If desired, the contents of computer usable storage medium 11 can be uploaded into the hard drive of computer 10.

Figure 2:
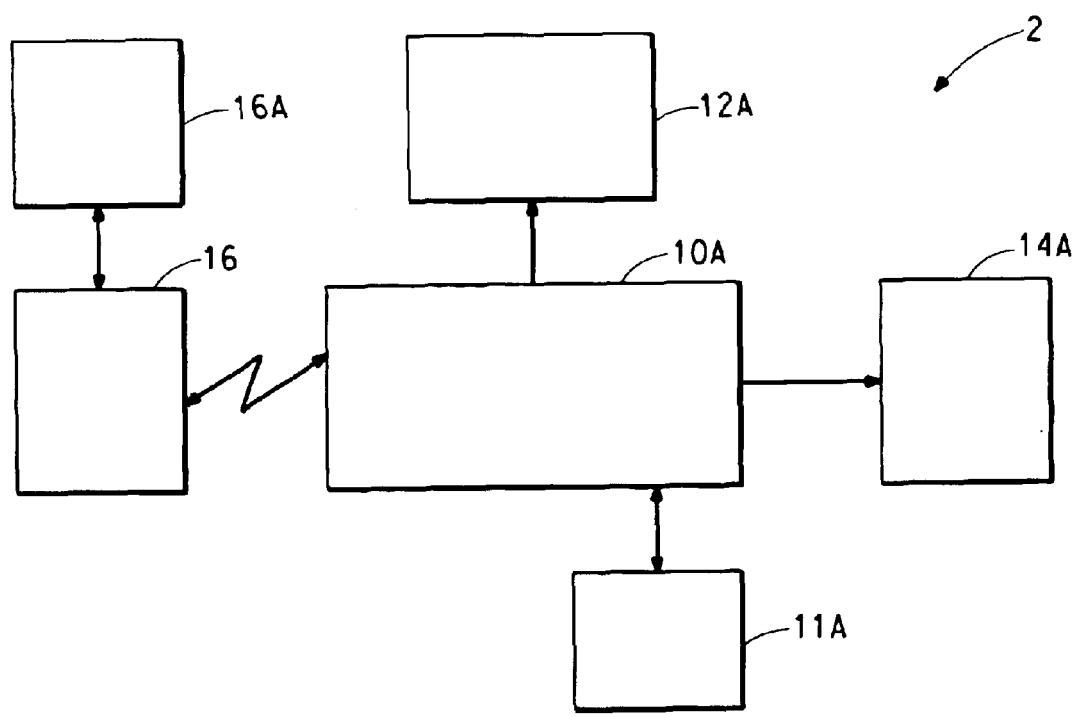
FIG. 2 broadly illustrates the hardware involved in another embodiment of the process of the present invention.

FIG. 2 shows another embodiment 2 of the present invention wherein a conventional client computer 10A is in communication, such as through a modem, with a host computer 16. Client computer 10A is connected to a display unit 12A and optionally connected to a conventional printer 14A. As is well known, display unit 12A can be an integral part of client computer 10A, such as a display screen of a lap top computer. Client computer 10A is provided with a conventional computer usable storage medium 11A, such as, a floppy disc or CD-ROM and host computer 16 is provided with a conventional computer usable storage medium 16A, such as, a floppy disc or CD-ROM.

Figure 3B:
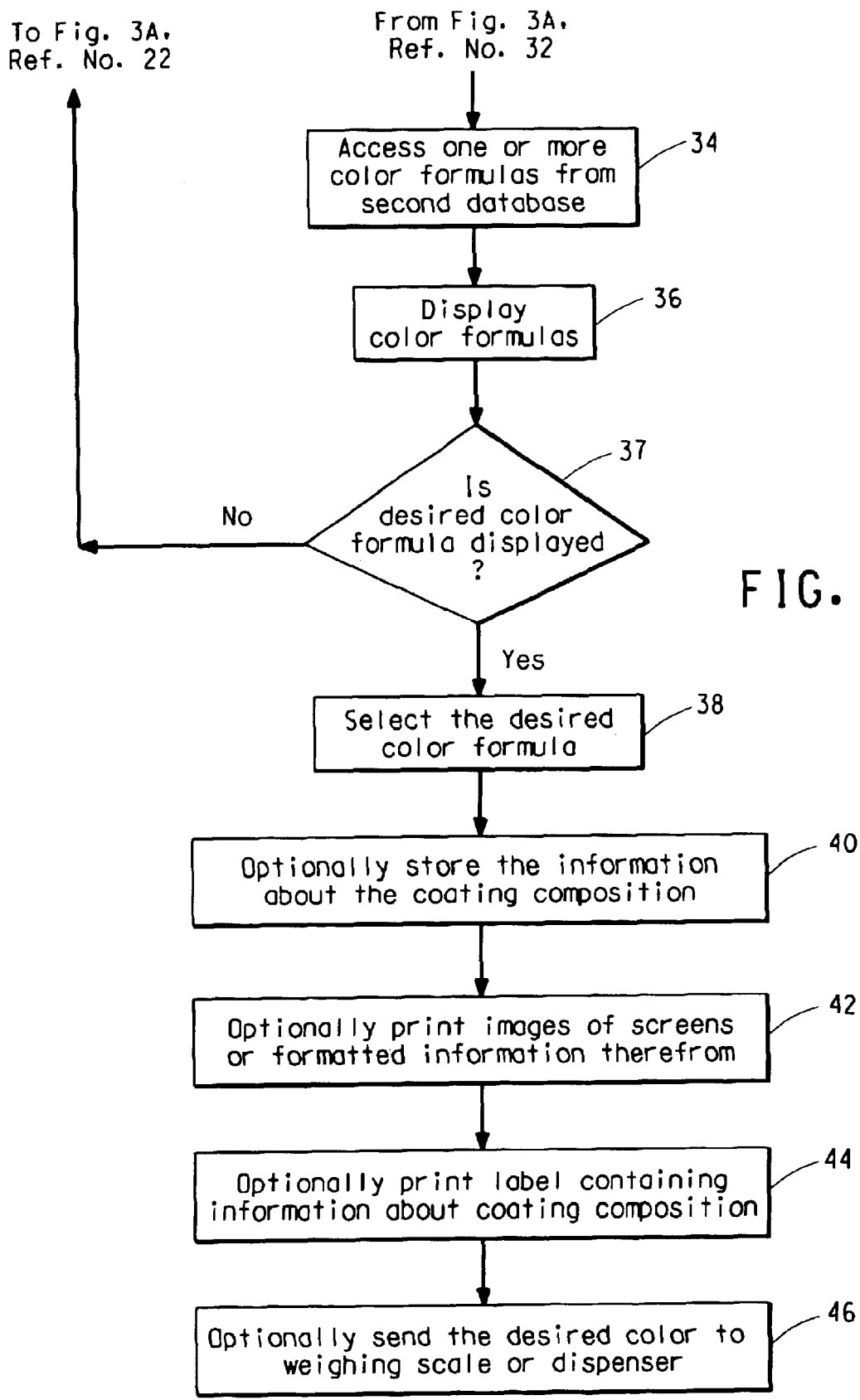
Figure 4:
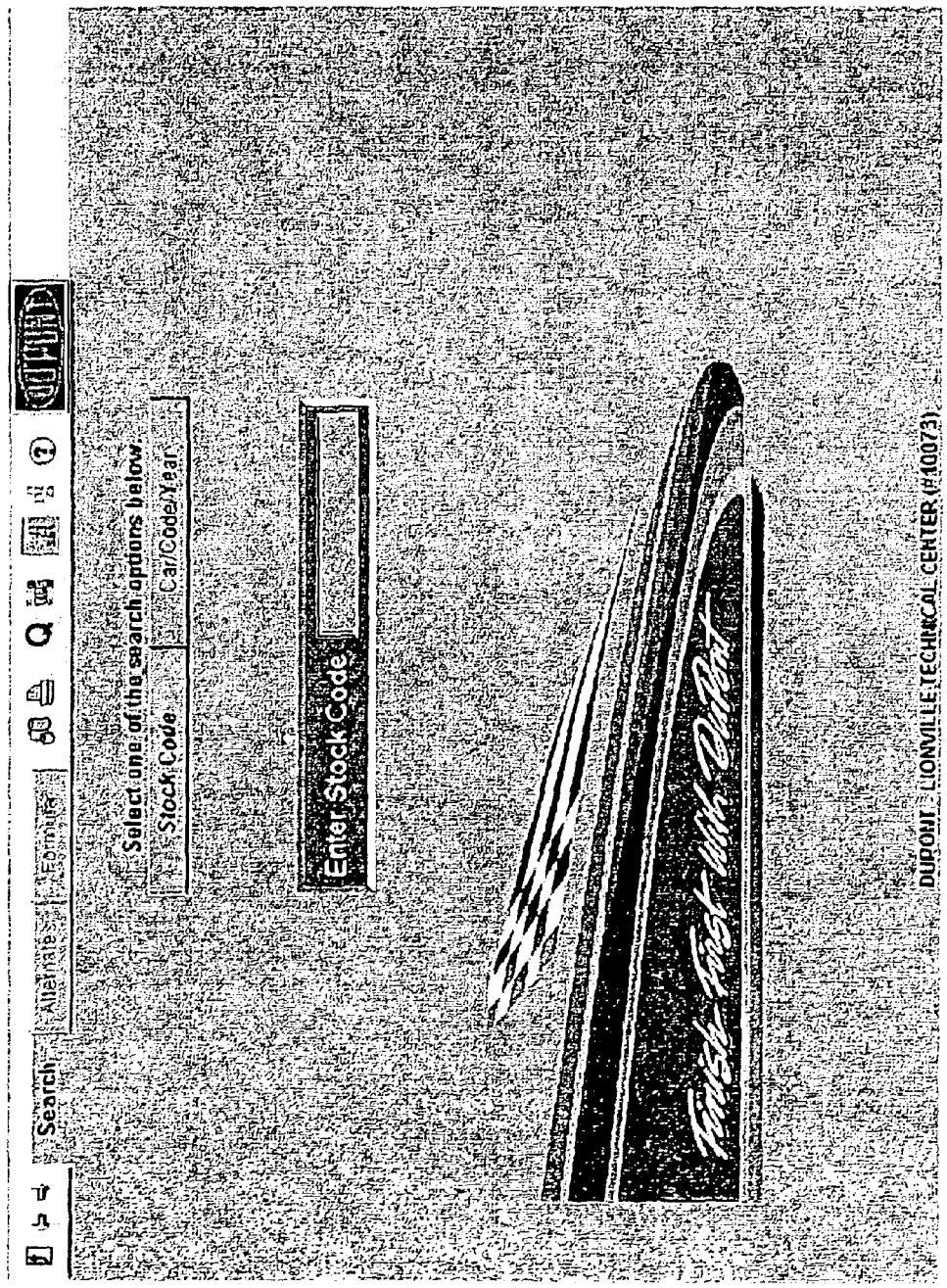

FIGS. 3A and 3B illustrate the steps used in a color selection method of the present invention:

In a step 22, identification criteria of a color of a coating composition are entered into computer 10. Typical identification criteria when applied to obtaining a vehicle paint can include, but are not limited to, a manufacturer name, make, model, year of production, color name, paint code, cross reference information, intended use, VIN number or spectrophotometric data of a vehicle, or its color. It should be noted that the present method can be also used for preparing architectural paint, industrial paint or color coating compositions applied over wood or cementitious substrate surfaces. It would be then be understood that the identification criteria in such instances would include appropriate information, such as the type of surface on which the compositions are to be applied. Preferably, step 22 is completed in two sub-steps. Sub-step A starts with entering one or more easily identifiable criteria from the aforedescribed criteria into computer 10, which can be, if desired, displayed on the screen of display unit 12. For Example, FIG. 4 is a screen shot in which the vehicle stock code or Car/Code/Year of the vehicle is entered. FIG. 5 is a screen shot in which when the vehicle manufacturer's name and year was entered, a more detailed list of the identification criteria, such as color name and manufacture code, that match the initially entered short identification criteria, such as stock code, is listed.

In a step 24, a search of a first database is initiated to identify one or more color characteristics that match the identification criteria entered in step 22. Typically the color characteristics can be accessed by, for example, clicking on any of the identified criteria shown in FIG. 5 by highlighting the criteria or clicking on such identified criteria.

In a step 26, the color characteristics are accessed from a first database stored memory storage device 11 of computer 10. The color characteristics include spectral data of the color, such as for example, L,a,b data of the color.

Color has long been measured through the use of spectrophotometers, which measure the percentage of light reflected at each wavelength over the visible region of the electromagnetic spectrum. Typically these readings are taken at 10 nm intervals from 400 nm to 700 nm. A plot of the percent reflectance as a function of wavelength is referred to as a "spectral curve". Viewing a spectral curve, one can determine the hue of a color represented from the peak of the curve, e.g., the spectral curve of a blue color would peak in blue wavelengths. A light color would reflect more light across the spectrum, a darker color reflects less light. A high chroma color would have a reasonably sharper peak and reflect considerably less light at other wavelengths. A low chroma color would have a curve with little difference between peak and trough. Grays would tend to be very flat. Thus a qualitative assessment of the color is possible from a spectral curve. However, color as seen by a human observer is dependent not only on the spectral curve of the color but also the spectral characteristics of the light source under which it is viewed and the spectral sensitivity of the observer. The human eye has three sensors for color vision—a blue sensor, a green sensor and a red sensor. In 1931, the International Committee on Illumination (CIE) standardized the mapping of color in a three-dimensional X, Y, Z space, allowing for the spectral characteristics of the color, the light source and the observer. However it is still difficult to visualize a color from its tristimulus values X, Y, Z. Also, these values do not provide a visually uniform three-dimensional mapping of color.

The foregoing difficulties are addressed by using mathematical transformations to "uniform color space" known as L,a,b data, which are described in COLOR VISION IN INSTRUMENTAL COLOR MATCHING OF SOLID AND METALLIC COLORS by A. B. J. Rodrigues (Proceedings of the Sixteenth International Conference in Organic Coatings Science and Technology, Athens Greece, 1990). The aforementioned reference is hereby incorporated herein by reference. The L,a,b data of the color describes the position of the color. The L,a,b data of each color is a three dimensional rendering of color space in Cartesian coordinates in which a Lightness axis (L*), a red-green axis (a*), and a yellow-blue axis (b*), are described by the following equations:

$$L^* = 116(Y/Y_0)1/3 - 16 \quad (1)$$

$$A^* = 500[(X/X_0)1/3 - (Y/Y_0)1/3] \quad (2)$$

$$b^* = 200[(Y/Y_0)1/3 - (Z/Z_0)1/3] \quad (3)$$

In the foregoing equations, $X_0$, $Y_0$ and $Z_0$ are the tristimulus values of a perfect white color for a given illuminant; and X, Y and Z are the tristimulus values for the color to be evaluated. Additional information is also proved in an article entitled "*Theory and Implementation of Modem Techniques of Color Conception, Matching and Control*" by A. B. J. Rodrigues, which is described in the Fifth International Conference in Organic Coatings Science and Technology Proceedings, Vol. 3, Advances in Organic Coatings Science and Technology Series, p. 272–282, (1979) and U.S. Pat. No. 4,403,866, both of which are incorporated herein by reference.

Once the color characteristics, such as the L,a,b data, are obtained, then in a step 28, the color characteristics are converted into one or more color reference chips by determining the corresponding RGB data for the color characteristics obtained in step 26. The algorithms described below can be used for converting the color characteristics into the RGB (red/green/blue) data.

The conversion is accomplished by taking the L,a,b data of the formula (3-axis measurement system) and mathematically converting the L,a,b data into a grid system where red (R) is defined on a 35 degree angle, green (G) is defined on a 145 degree angle, and blue (B) is defined on a 280 degree angle. Factors are then applied to these numbers to fit them within a valid range of RGB values. The red, green and blue components are calculated by converting from L,a,b angle measurements to L,a,b radians measurement. The red, green, and blue values are then mathematically adjusted for lightness and scaled to fit the display medium.

Temporary RGB values for the L,a,b data are obtained by using the following equations:

$$\text{RED\_1} = \cos(ab\_\text{angle} - 35)/180 * 3.14) * (a2 + b2)1/2 + 18 \quad (4)$$

$$\text{GREEN\_1} = \cos(ab\_\text{angle} - 145)/180 * 3.14) * (a2 + b2)1/2 + 18 \quad (5)$$

$$\text{BLUE\_1} = \cos(ab\_\text{angle} - 280)/180 * 3.14) * (a2 + b2)1/2 + 18 \quad (6)$$

Ab_Angle=The number of degrees counter clockwise from the +A axis and the cosine (COS) in radians.

The temporary RGB values obtained from the aforementioned equations are then adjusted to produce the RGB data that is suitable for display on display unit 12 by using the following equations:

$$\text{RED} = \text{RED\_1} * \text{Lightness}/\text{MAX\_RGB} * 4 \quad (7)$$

$$\text{GREEN} = \text{GREEN\_1} * \text{Lightness}/\text{MAX\_RGB} * 4 \quad (8)$$

$$\text{BLUE} = \text{BLUE\_1} * \text{Lightness}/\text{MAX\_RGB} * 4 \quad (9)$$

MAX_RGB=Maximum RGB of RED_1, GREEN_1, and BLUE_1 temporary values calculated through equations (4), (5), and (6) above.

Figure 6:
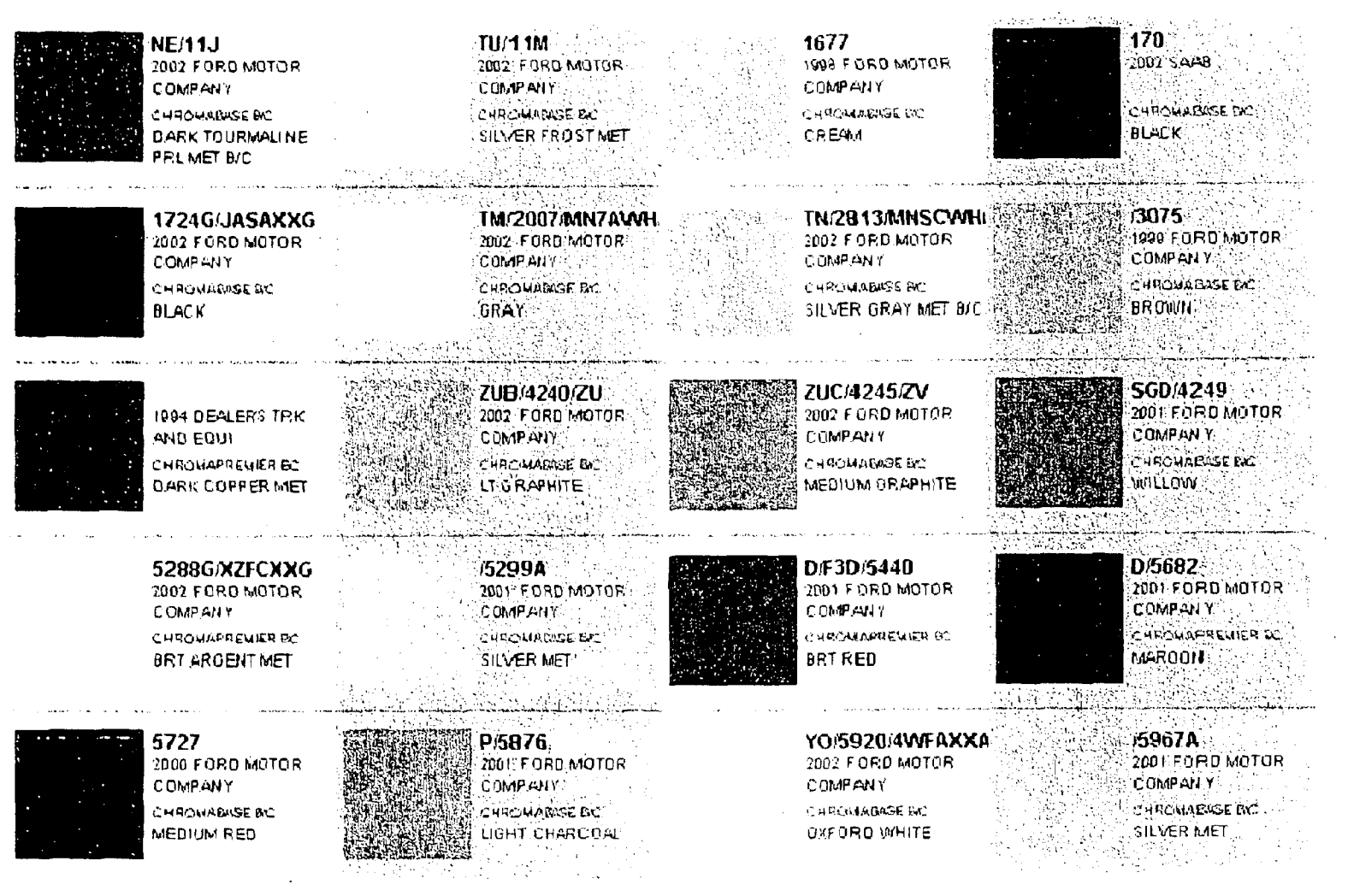

In a step 30, the RGB data thus obtained allows computer 10 to display the color reference chips on the screen of display unit 12, which is illustrated in the screen shot shown in FIG. 6.

It should be understood that the user may not find a desired color reference chip from color reference chips displayed on display unit 12 on the first try in which case the user, upon a query 31, may repeat steps 22 though 30 again until the desired color reference chip can be selected through a step 32, if desired, by using a different set of identification criteria. Preferably, the user selects the desired color reference chip by visual inspection.

There are other alternative means available to the user for selecting the desired color reference chip. For example, the user can take a digital photograph of the existing color on the vehicle being restored by using any conventional digital camera and then conventionally uploading the photograph from the camera into computer 10, comparing the color in the simultaneously displayed image of the digital photograph against the various color reference chips being displayed on display unit 12, and then visually selecting the color reference chip that closely matches the color in the image of the digital photograph. It is within the contemplation of the present invention for the user to take a conventional photograph of the vehicle, scan the photograph on a color scanner, and then upload the scanned image into computer 10.

Yet another alternative would be to use a conventional portable spectrophotometer, such as ChromaVision® supplied by DuPont Company of Wilmington, Del. to obtain the color characteristics, such as L,a,b readings, of the existing color on the vehicle being restored, uploading the color characteristics into computer 10, converting the color characteristics into RGB readings, which can then be simultaneously displayed as an image along with the various color reference chips being displayed on display unit 12. The user can then compare and select the color reference chip that closely matches the color in the image obtained from using a conventional portable spectrophotometer by the steps described above.

Still another alternative, especially for late model vehicles, would be to access a website of the vehicle manufacturer, select the model on the website that matches the vehicle to be painted and then compare the color of the vehicle from the website displayed simultaneously on display unit 12 with the color reference chips to compare and select the color reference chip that closely matches the color of the vehicle obtained from the website.

Figure 7:
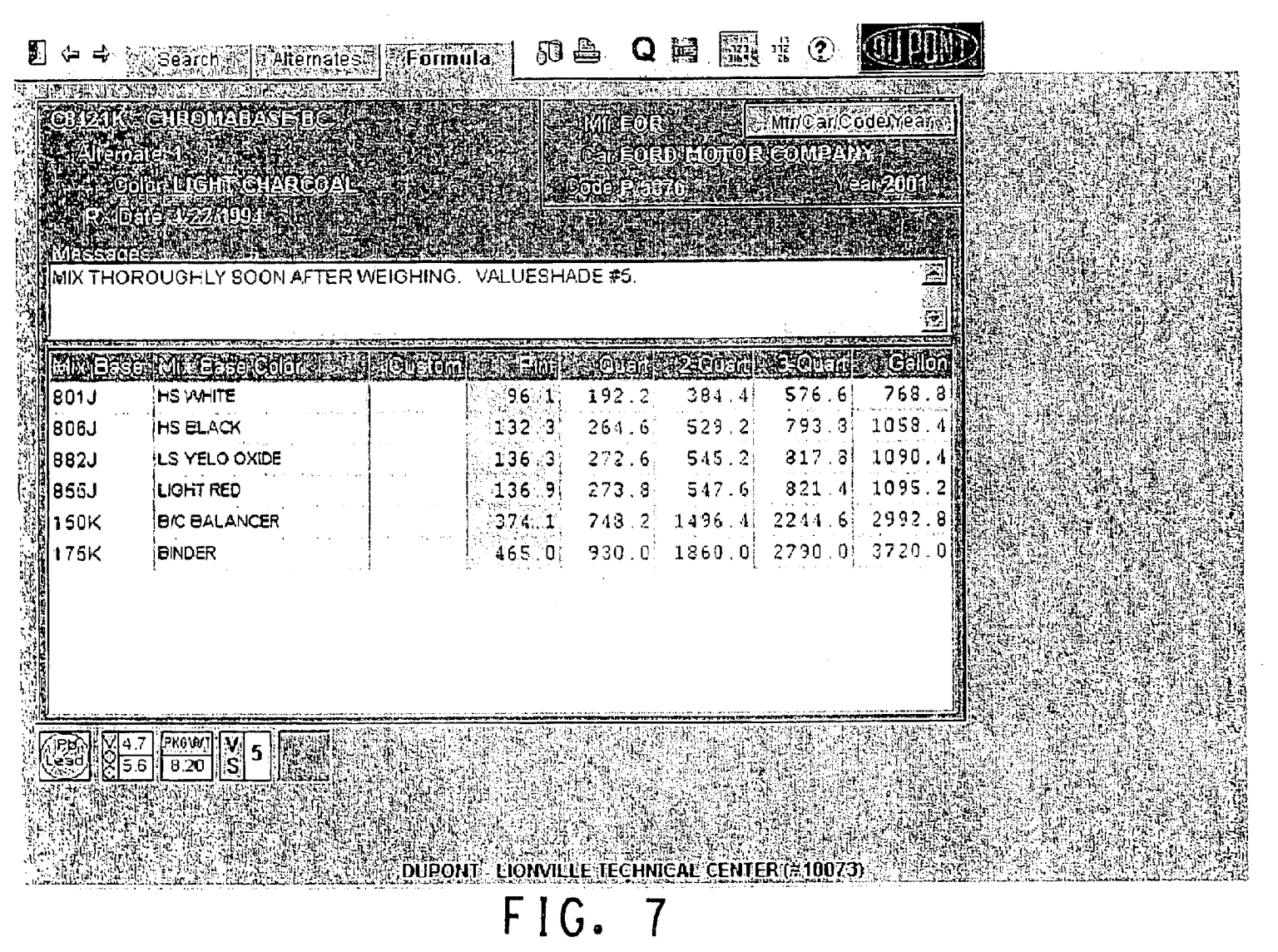

Once a desired color reference chip is selected in step 32, preferably the selected chip image on the screen of display unit 12 is highlighted or double clicked in a step 34 to access one or more color formulas from a second database stored on computer 10 that match the desired color reference chip. In a step 36, as seen in FIG. 7, the color formulas accessed from the second database that match the desired color reference chip are displayed on display unit 12.

It should be understood that the user may not find a desired color formula from color formulas displayed on display unit 12 on the first try in which case the user, upon a query 37, may repeat steps 22 though 36 again until the desired color formula can be selected through a step 38, if desired, by using a different set of identification criteria. Preferably, the user selects the desired color formula by visual inspection.

If desired, through an optional step 40, all or some of the information about the coating composition, such as one or more of the desired color formula, the desired color reference chip or the identification criteria associated with the desired color reference chip, can be stored on computer 10 for future use, such that all the foregoing information can be displayed again on display unit 12. If desired, the foregoing information can be stored on a separate storage medium, such as a CD-ROM, or sent to a remote storage site.

If desired, through an optional step 42, any one of the images of the screen of display unit 12 can be printed on a printable sheet through printer 14 connected to computer 10. The suitable printable paper can be a photocopy paper, high gloss photographic quality paper or a high gloss plastic film. The high gloss photographic quality paper is preferred and more particularly preferred is 70# White Plainfield Opaque Offset paper (20% post consumer waste) having 92-gloss level supplied by Domtar located in Vancouver, British Columbia, Canada.

If desired, the printable sheet can include one or more comparison windows, preferably an oval opening, positioned within the area on the printable sheet over which each of the color reference chips is printed. The color on the color reference chip can be compared for a correct color match by placing the color reference chip over an existing painted surface on a vehicle such that the existing painted surface is seen through the comparison window and can then be readily compared with the color on the color reference chip that surrounds the window. Moreover, if desired, the user can develop his own color reference chip manual by using optional printing step 42 of the present invention.

If desired, through an optional step 44, printer 14 can be employed to print the desired color formula on a printable sheet, which can then be delivered to a technician preparing the coating composition based on the desired color formula. If desired, an identifying label containing relevant information of the coating composition, such as identification criteria, the desired color reference chip and, if required, the desired color formula could also be prepared for a container in which the resulting coating composition is stored for future use.

If desired, though an optional step 46, the desired color formula can be sent to a conventional tint dispenser or a weighing scale connected to computer 10 to allow the user to weigh the amounts of various tints and other ingredients selected in accordance with the desired color formula to produce the coating composition. It should be understood that the images of the screen or any information associated therewith could be suitably modified to some other suitable format before employing the aforedescribed steps 40 through 46.

The foregoing method is programmed by using conventional programming software, such as C++ Builder, Version 5 or Delphi, Version 6, both supplied by Borland Corporation located in Scotts Valley, Calif.

The present method is equally well suited for using the computer set up described in FIG. 2. It would be understood that the communication between host computer 16 and client computer 10A can be through a modem or via a website. Moreover, in the client/host computer network of FIG. 2, the first database can reside either on storage device 11A of client computer 10A or on storage device 16A of host computer 16, which is accessed by client computer 10A in communication with host computer 16. Similarly, the second database can reside either on storage device 11A of client computer 10A or on storage device 16A of host computer 16, which is accessed by client computer 10A in communication with host computer 16. Preferably, the first database resides on client computer 10A and the second database resides on host computer 16.

Figure 8A:
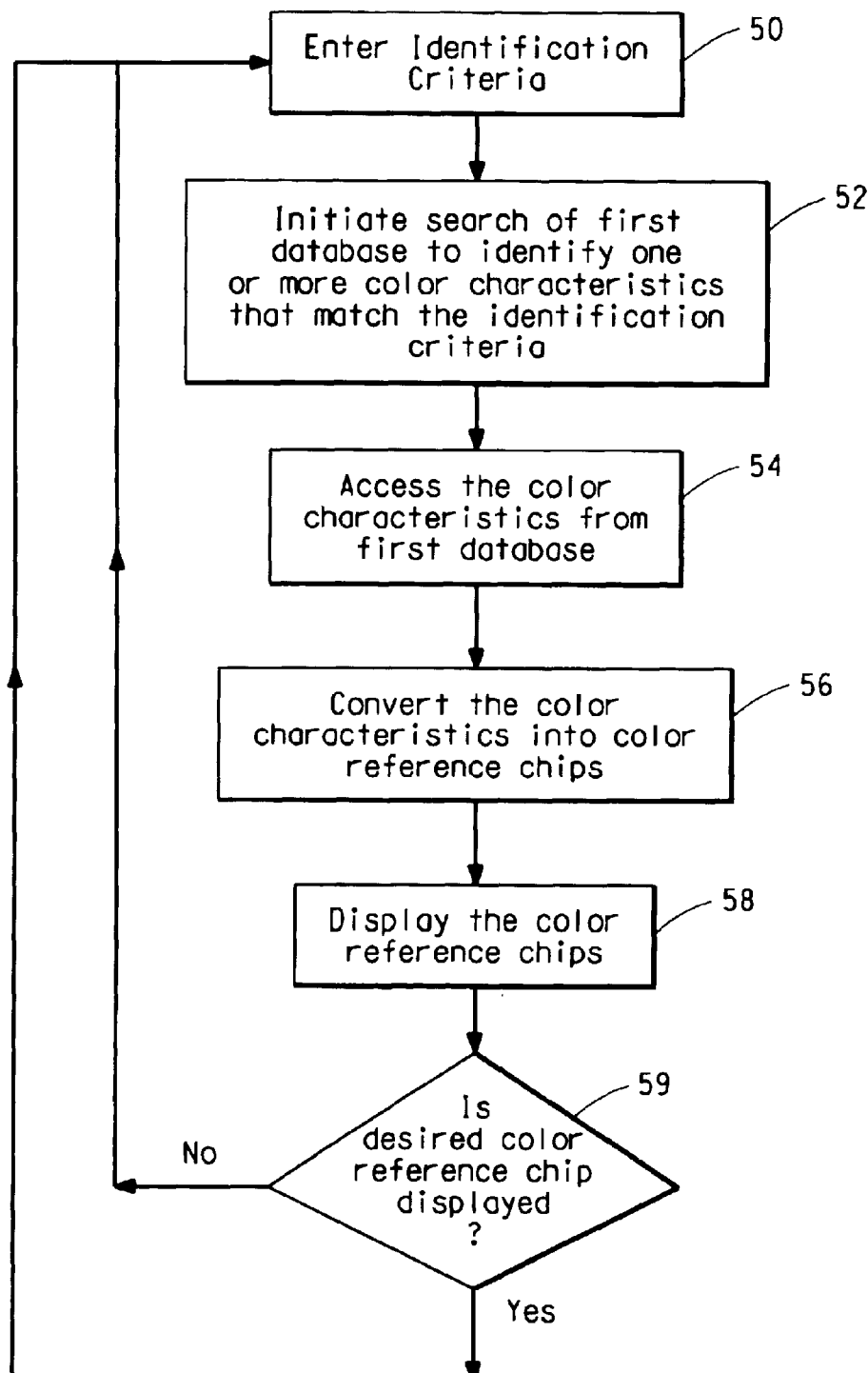
FIGS. 8A and 8B represent a flowchart that broadly illustrates the steps taking place in the embodiment of the process of the present invention illustrated in FIG. 2 as viewed from a client computer side.
Figure 8B:
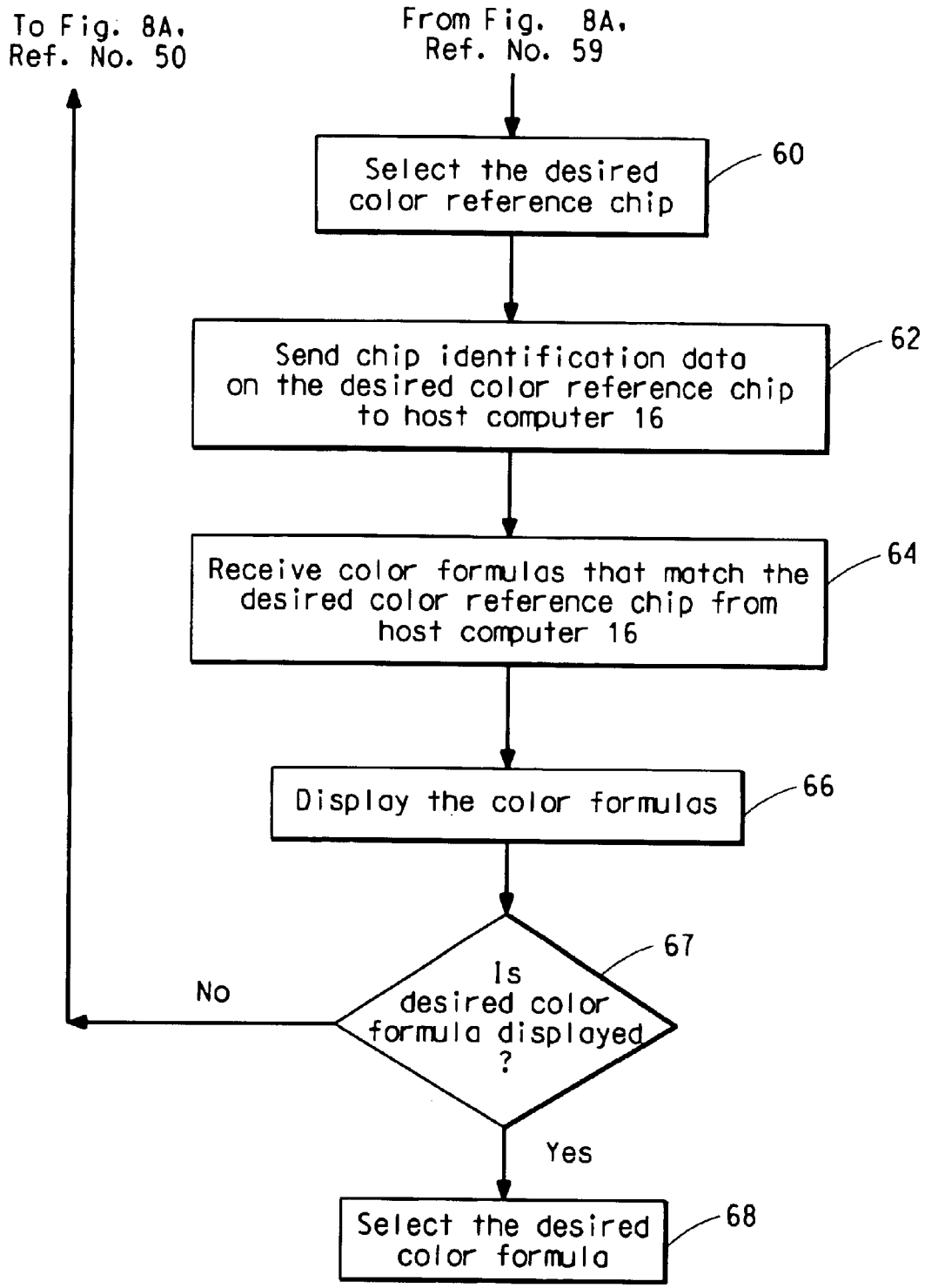

A color selection method utilizing the client/host computer network, as viewed from client computer 10A in communication with host computer 16, includes the following steps illustrated in FIGS. 8A and 8B:

In a step 50, identification criteria of a color of a coating composition are entered into client computer 10A.

In a step 52, a search of first database stored on client computer 10A is initiated to identify one or more color characteristics that match the identification criteria.

In a step 54, the color characteristics are accessed from the first database.

In a step 56, the color characteristics are converted into color reference chips on client computer 10A.

In a step 58, the color reference chips are displayed on the screen of display unit 12A of client computer 10A.

It should be understood that the user may not find a desired color reference chip from the color reference chips displayed on display unit 12 on the first try in which case the user, upon a query 59, may repeat steps 50 though 58 again until the desired color reference chip can be selected through a step 60, if desired, by using a different set of identification criteria. Preferably, the user selects the desired color reference chip by visual inspection. However, the user can apply other means, such as those described above.

In a step 62, identification data on the desired color reference chip are sent by client computer 10A to host computer 16.

In a step 64, host computer 16 sends to client computer 10A one or more color formulas that match the desired color reference chip and client computer 10A receives the color formulas sent by host computer 16. The color formulas are stored in a second database on host computer 16.

In a step 66, the color formulas are displayed on the screen of display unit 12A of client computer 10A.

It should be understood that the user may not find a desired color formula from the color formulas displayed on display unit 12 on the first try in which case the user, upon a query 67, may repeat steps 50 though 66 again until the desired color formula can be selected through a step 68, if desired, by using a different set of identification criteria. Preferably, the user selects the desired color formula by visual inspection. However, the user can apply other means, such as those described above.

If desired, it should also be understood that one or more of the identification criteria, the color reference chips selected, the desired color reference chip, the color formulas that match the desired color reference chip and the desired color formula can be stored on client computer 10A or printed on printer 14A attached to client computer 10A in accordance with the optional steps 40 through 46 described earlier.

Figure 9:
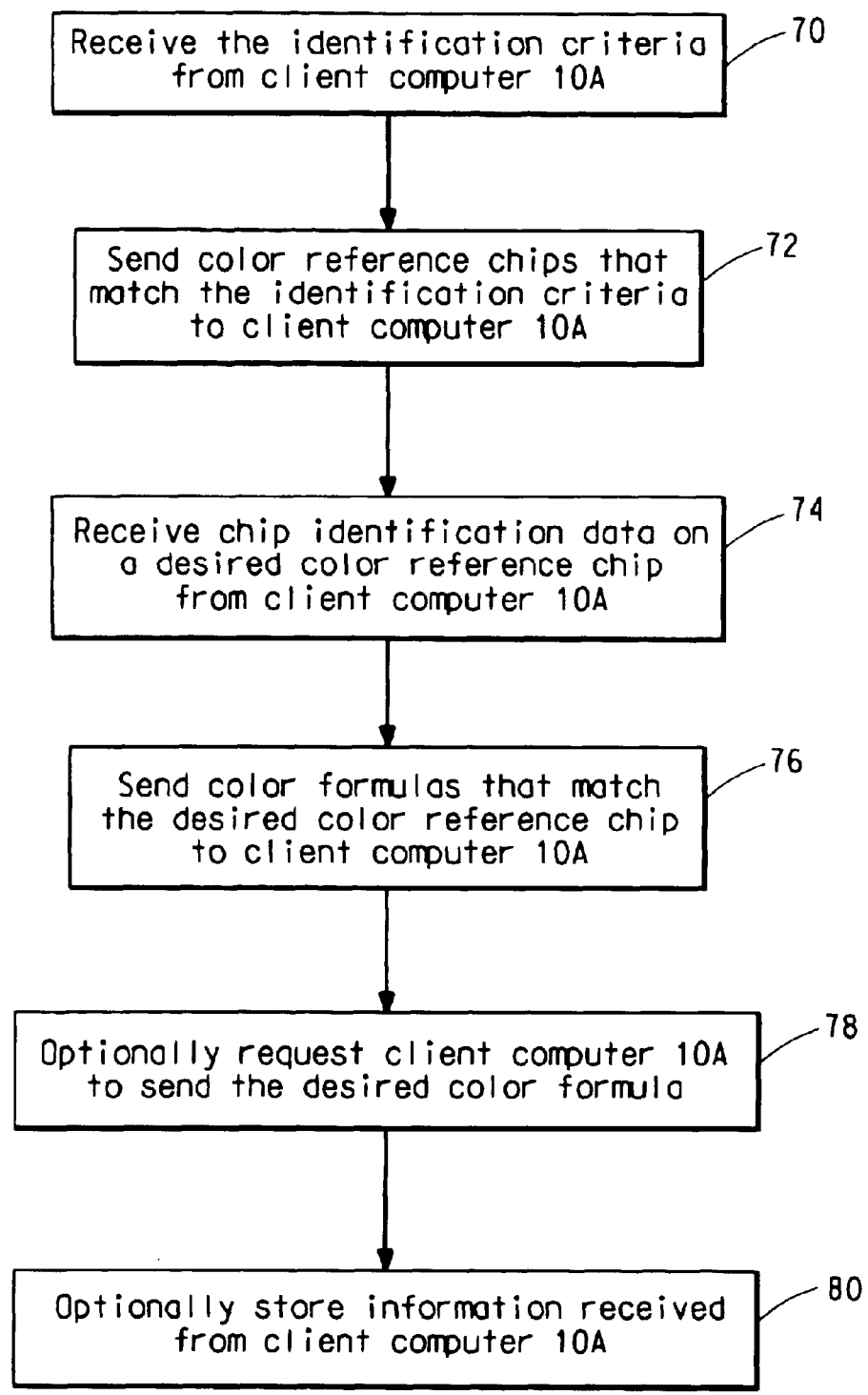
FIG. 9 represents a flowchart that broadly illustrates the steps taking place in the embodiment of the process of the present invention illustrated in FIG. 2 as viewed from a host computer side.

A color selection method utilizing the client/host computer network, as viewed from host computer 16 in communication with client computer 10A includes the following steps illustrated in FIG. 9:

In a step 70, identification criteria of a color of a coating composition are received from client computer 10A, which is in communication with host computer 16.

In a step 72, one or more color reference chips converted by host computer 16 from color characteristics that match the identification criteria of the color are sent by host computer 16 to client computer 10A;

In a step 74, chip identification data on a desired color reference chip selected by client computer 10A from the color reference chips is received by host computer 16 from client computer 10A.

Finally, in a step 76, one or more color formulas that match the desired color reference chip are sent by host computer 16 to client computer 10A to allow the user to select a desired color formula from the color formulas.

In an optional step 78, host computer 16 can request client computer 10A to send the desired color formula selected by the user to host computer 16. If desired, host computer 16 can then ship to the location of client computer 10A various components of the coating composition, such as tints, that are listed in the desired color formula.

In another optional step 80, host computer 16 can store for future use all or some of the information received from client computer 10A, such as the identity (Name of the user and the user's organization, street address of the organization) of client computer 10A, the type of coating compositions, the popularity of the colors being selected and types of tints used in the desired color formula.

The present invention is also directed to a computer usable storage medium 11 having computer readable program code means embodied therein for causing selection of a desired color formula by a computer 10 by utilizing the steps illustrated in FIGS. 3A and 3B. The computer readable program code includes:

(a) computer readable program code devices configured to cause the computer 10 to enter identification criteria of a color of a coating composition into the computer 10, which is in step 22;

(b) computer readable program code devices configured to cause the computer 10 to initiate a search of a first database for identifying one or more color characteristics that match the identification criteria, wherein the first database is stored on the computer 10, which is in step 24;

(c) computer readable program code devices configured to cause the computer 10 to access the color characteristics from the first database, which is in step 26;

(d) computer readable program code devices configured to cause the computer 10 to convert the color characteristics into color reference chips, which is in step 28;

(e) computer readable program code devices configured to cause the computer 10 to display the color reference chips on the screen of the computer 10, which is in step 30;

(f) computer readable program code devices configured to cause the computer 10 to select a desired color reference chip from the color reference chips, which is in step 32;

(g) computer readable program code devices configured to cause the computer 10 to access one or more color formulas that match the desired color reference chip wherein the color formulas are stored in a second database on the computer 10, which is in step 34; and (h) computer readable program code devices configured to cause the computer 10 to display the color formulas on the screen, which is in step 36.

Medium 11 can be programmed to include optional steps 40 through 46 described earlier.

The present invention is also directed to a computer program product that includes a client computer usable storage medium 11 A having computer readable program code means embodied therein for causing the selection of a desired color formula by a client computer 10A in communication with a host computer 16 by utilizing the steps illustrated in FIGS. 8A and 8B. The client computer readable program code includes:

(a) computer readable program code devices configured to cause client computer 10A to enter identification criteria of a color of a coating composition into client computer 10A, which is in step 50;

(b) computer readable program code devices configured to cause the client computer 10A to initiate a search of a first database for identifying one or more color characteristics that match the identification criteria, the first database being stored on the client computer 10A, which is in step 52;

(c) computer readable program code devices configured to cause the client computer 10A to access the color characteristics from the first database, which is in step 54;

(d) computer readable program code devices configured to cause the client computer 10A to convert the color characteristics into color reference chips, which is in step 56;

(e) computer readable program code devices configured to cause the client computer 10A to display the color reference chips on the screen of the client computer 10A, which is in step 58;

(f) computer readable program code devices configured to cause the client computer 10A to send from the client computer 10A to the host computer 16 identification data on a desired color reference chip selected from the color reference chips displayed on the screen, which is in step 60;

(g) computer readable program code devices configured to cause the client computer 10A to receive from the host computer 16 one or more color formulas that match the desired color reference chip, the color formulas being stored in a second database on host computer 16, which is in step 62; and (h) computer readable program code devices configured to cause the client computer 10A to display the color formulas on the screen of the client computer 10A to allow selection of the desired color formula from the color formulas, which is in step 64.

If desired, the client computer readable program code of the client computer program product further includes computer readable program code devices configured to cause the client computer 10A to print on a printer 14A an image of the displayed screen on a printable sheet, the desired color formula from the color formulas or both.

The present invention is further directed to a host computer program product, which includes a host computer usable storage medium 16A having computer readable program code means embodied therein for causing the selection of a desired color formula by a client computer 10A in communication with the host computer 16 by utilizing the steps illustrated in FIG. 9. The host computer readable program code includes:

(a) computer readable program code devices configured to cause the host computer 16 to receive from the client computer 10A an identification criteria of a color of a coating composition, which is step 70;

(b) computer readable program code devices configured to cause the host computer 16 to send the client computer 10A one or more color reference chips converted by the host computer 16 from color characteristics that match the identification criteria of the color, which is step 72;

(c) computer readable program code devices configured to cause the host computer 16 to receive from the client computer 10A chip identification data on the desired color reference chip selected by the client computer 10A from the color reference chips, which is step 74; and (d) computer readable program code devices configured to cause the host computer 16 to send to the client computer 10A one or more color formulas that match the desired color reference chip to allow selection of a desired color formula from the color formulas, which is step 76.

If desired, computer readable program code devices can be configured to cause the host computer 16 to request client computer 10A to send the desired color formula selected by the user, which is optional step 78. If desired, computer readable program code devices can be further configured to cause the host computer 16 to store for further use all or some of the information received from client computer 10A, which is optional step 80.

The present invention is also directed to a process for making coating composition comprising:

(a) entering identification criteria of a color of a coating composition into a computer 10A;

(b) initiating a search of a first database to identify one or more color characteristics that match the identification criteria, the first database being stored on the computer 10A;

(c) accessing the color characteristics from the first database;

(d) converting the color characteristics into color reference chips;

(e) displaying the color reference chips on screen of the computer 10A;

(f) selecting a desired color reference chip from the color reference chips;

(g) accessing one or more color formulas from a second database that match the desired color reference chip, the second database being stored on the computer 10A;

(h) displaying the color formulas on the screen;

(i) selecting a desired color formula from the color formulas; and (j) mixing components listed in the desired color formula to form the coating composition.

What is claimed is:

1. A color selection method comprising:
   (a) entering identification criteria of a color of a coating composition into a computer (10);
   (b) initiating a search of a first database to identify one or more color characteristics that match the identification criteria;
   (c) accessing said color characteristics from said first database;
   (d) converting said color characteristics into color reference chips;
   (e) displaying said color reference chips on screen of said computer (10);
   (f) selecting a desired color reference chip from said color reference chips;
   (g) accessing one or more color formulas from a second database that match said desired color reference chip;
   (h) displaying said color formulas on said screen; and
   (i) selecting a desired color formula from said color formulas.

2. The method of claim 1 further comprising storing for future use on said computer (10) said desired color formula, said desired color reference chip, said identification criteria, or a combination thereof.

3. The method of claim 1 further comprising displaying said identification criteria on said screen.

4. The method of claim 1 further comprising displaying said identification criteria and said color formulas on said screen.

5. The method of claim 1, 3 or 4 further comprising printing an image of said screen on a printable sheet on a printer 14.

6. The method of claim 5 wherein said printable sheet is a photocopy paper, high gloss photographic quality paper or a high gloss plastic film.

7. The method of claim 6 wherein said printable sheet is provided with a comparison window positioned within the area on said printable sheet over which each said color reference chip is printed.

8. The method claim 1 wherein further comprising printing an identifying label of the coating composition.

9. The method of claim 1 wherein said identification criteria comprise one or more of a manufacturer name, make, model, year of production, color name, paint code, cross reference information, intended use, VIN number, or spectrophotometric data of a vehicle or its color.

10. The method of claim 1 wherein said desired color formula is sent to a dispenser or a weighing scale.

11. The method of claim 1 wherein said color characteristics comprise spectral data of said color.

12. The method of claim 11 wherein said converting step comprises:

accessing L,a,b data of said color;

transforming said L,a,b data into RGB data of said color; and formatting said RGB data into said color reference chips.

13. The method of claim 1 wherein said computer is a client computer (10A) in communication with a host computer (16).

14. The method of claim 13 wherein said first database resides on said client computer (10A) and said second database resides on said host computer (16), said first and said second database reside on said host computer (16), or said first and said second database reside on said client computer (10A).

15. A color selection method comprising:

(a) entering identification criteria of a color of a coating composition into a client computer (10A);

(b) initiating a search of first database stored on said client computer (10A) to identify one or more color characteristics that match the identification criteria;

(c) accessing said color characteristics from said first database;

(d) converting said color characteristics into color reference chips;

(e) displaying said color reference chips on screen of said client computer (10A);

(f) selecting a desired color reference chip from said color reference chips displayed on said screen;

(g) sending chip identification data on said desired color reference chip to said host computer (16);

(h) receiving from said host computer (16) one or more color formulas that match said desired color reference chip, wherein said color formulas are stored in a second database on said host computer (16);

(i) displaying said color formulas on screen of said client computer (10A); and (j) selecting a desired color formula from said color formulas.

16. A color selection method comprising:

(a) receiving from a client computer (10A) an identification criteria of a color of a coating composition, said client computer (10A) being in communication with a host computer (16);

(b) sending to said client computer (10A) one or more color reference chips converted by said host computer (16) from color characteristics that match the identification criteria of said color;

(c) receiving from said client computer (10A) chip identification data on said desired color reference chip selected by said client computer (10A) from said color reference chips; and (d) sending to said client computer (10A) one or more color formulas that match said desired color reference chip to allow selection of a desired color formula from said color formulas.

17. A computer program product comprising:

(a) a computer usable storage medium (11) having computer readable program code means embodied therein for causing selection of a desired color formula by a computer (10), said computer readable program code comprising:

(b) computer readable program code devices configured to cause said computer (10) to enter identification criteria of a color of a coating composition into said computer (10);

(c) computer readable program code devices configured to cause said computer (10) to initiate a search of a first database for identifying one or more color characteristics that match the identification criteria, wherein said first database is stored on said computer (10);

(d) computer readable program code devices configured to cause said computer (10) to access said color characteristics from said first database;

(e) computer readable program code devices configured to cause said computer (10) to convert said color characteristics into color reference chips;

(f) computer readable program code devices configured to cause said computer (10) to display said color reference chips on screen of said computer (10);

(g) computer readable program code devices configured to cause said computer (10) to select a desired color reference chip from said color reference chips;

(h) computer readable program code devices configured to cause said computer (10) to access one or more color formulas that match said desired color reference chip wherein said color formulas stored in a second database on said computer (10); and (i) computer readable program code devices configured to cause said computer (10) to display said color formulas on said screen.

18. A computer program product comprising:

(a) a client computer usable storage medium (11A) having computer readable program code means embodied therein for causing selection of a desired color formula by a client computer (10A) in communication with a host computer (16), said client computer readable program code comprising:

(b) computer readable program code devices configured to cause said client computer (10A) to enter identification criteria of a color of a coating composition into said client computer (10A);

(c) computer readable program code devices configured to cause said client computer (10A) to initiate search of a first database for identifying one or more color characteristics that match the identification criteria, said first database being stored on said client computer (10A);

(d) computer readable program code devices configured to cause said client computer (10A) to access said color characteristics from said first database;

(e) computer readable program code devices configured to cause said client computer (10A) to convert said color characteristics into color reference chips;

(f) computer readable program code devices configured to cause said client computer (10A) to display said color reference chips on screen of said client computer (10A);

(g) computer readable program code devices configured to cause said client computer (10A) to send from said client computer (10A) to said host computer (16) identification data on a desired color reference chip selected from said color reference chips displayed on said screen;

(h) computer readable program code devices configured to cause said client computer (10A) to receive from said host computer (16) one or more color formulas that match said desired color reference chip, said color formulas being stored in a second database on said host computer (16); and (i) computer readable program code devices configured to cause said client computer (10A) to display said color formulas on screen of said client computer (10A) to allow selection of said desired color formula from said color formulas.

19. The client computer program product of claim 18 wherein said client computer readable program code further comprises computer readable program code devices configured to cause said client computer (10A) to print on a printer (14A) an image of said displayed screen on a printable sheet, said desired color formula from said color formulas or both.

20. A host computer program product comprising:

(a) a host computer usable storage medium (16A) having computer readable program code means embodied therein for causing selection of a desired color formula by a client computer (10A) in communication with said host computer (16), said host computer readable program code comprising:

(b) computer readable program code devices configured to cause said host computer (16) to receive from said client computer (10A) an identification criteria of a color of a coating composition;

(c) computer readable program code devices configured to cause said host computer (16) to send said client computer (10A) one or more color reference chips converted by said host computer (16) from color characteristics that match the identification criteria of said color;

(d) computer readable program code devices configured to cause said host computer (16) to receive from said client computer (10A) chip identification data on said desired color reference chip selected by said client computer (10A) from said color reference chips; and (e) computer readable program code devices configured to cause said host computer (16) to send to said client computer (10A) one or more color formulas that match said desired color reference chip to allow selection of a desired color formula from said color formulas.

21. A process for making coating composition comprising:

(a) entering identification criteria of a color of a coating composition into a computer (10A);

(b) initiating a search of a first database to identify one or more color characteristics that match the identification criteria, said first database being stored on said computer (10A);

(c) accessing said color characteristics from said first database;

(d) converting said color characteristics into color reference chips;

(e) displaying said color reference chips on screen of said computer (10A);

(f) selecting a desired color reference chip from said color reference chips;

(g) accessing one or more color formulas from a second database that match said desired color reference chip, said second database being stored on said computer (10A);

(h) displaying said color formulas on said screen;

(i) selecting a desired color formula from said color formulas; and (j) mixing components listed in said desired color formula to form said coating composition.

* * * * *